(12) United States Patent
Awad et al.

(10) Patent No.: US 7,560,143 B2
(45) Date of Patent: Jul. 14, 2009

(54) AQUEOUS NON-IONICALLY STABILIZED EPOXY RESINS

(75) Inventors: Rami-Raimund Awad, Graz (AT); Florian Lunzer, Graz (AT); Martin Gerlitz, Graz (AT)

(73) Assignee: Surface Specialties Austria GmbH (AT)

( * ) Notice: Subject to any disclaimer, the term of this patent is extended or adjusted under 35 U.S.C. 154(b) by 465 days.

(21) Appl. No.: 10/531,090

(22) PCT Filed: Oct. 17, 2003

(86) PCT No.: PCT/EP03/11561

§ 371 (c)(1),
(2), (4) Date: Apr. 11, 2005

(87) PCT Pub. No.: WO2004/037935

PCT Pub. Date: May 6, 2004

(65) Prior Publication Data

US 2005/0287302 A1  Dec. 29, 2005

(30) Foreign Application Priority Data

Oct. 21, 2002   (AT) .................. 1598/2002

(51) Int. Cl.
| | | |
|---|---|---|
| B05D 3/06 | (2006.01) | |
| B05D 1/02 | (2006.01) | |
| B05D 1/18 | (2006.01) | |
| C08F 2/46 | (2006.01) | |
| C08G 63/00 | (2006.01) | |
| C08L 63/00 | (2006.01) | |
| B32B 15/092 | (2006.01) | |
| B32B 27/38 | (2006.01) | |

(52) U.S. Cl. .................. 427/498; 427/385.5; 427/386; 427/388.1; 427/427.4; 427/427.5; 427/428.1; 427/429; 427/430.1; 427/435; 427/496; 522/1; 522/71; 522/100; 522/101; 523/400; 523/427; 525/454; 525/455; 525/524; 525/530; 525/533; 528/103; 528/106; 528/112; 528/115; 528/365

(58) Field of Classification Search .............. 525/454, 525/455, 523, 524, 525, 526, 528, 529, 530, 525/531, 533; 528/103, 106, 111.3, 111.5, 528/112, 365, 366; 523/400, 427; 522/1, 522/71, 100, 101; 427/372.2, 384, 385.5, 427/386, 388.1, 421.1, 427.4, 427.5, 428.01, 427/429, 430.1, 435, 457, 487, 496, 498, 427/595; 428/413, 418

See application file for complete search history.

(56) References Cited

U.S. PATENT DOCUMENTS

| | | | |
|---|---|---|---|
| 3,297,519 | A | 1/1967 | Rambosek |
| 4,151,219 | A | 4/1979 | Brewbaker et al. |
| 4,331,573 | A | 5/1982 | Zabrocki et al. |
| 4,351,922 | A | 9/1982 | Yoshida et al. |
| 4,452,929 | A | 6/1984 | Powers et al. |
| 4,886,845 | A | 12/1989 | Becker et al. |
| 5,548,005 | A | 8/1996 | Kurth et al. |
| 5,596,065 | A | 1/1997 | Gerlitz et al. |
| 5,629,374 | A * | 5/1997 | Budde et al. ............. 524/549 |
| 5,763,507 | A | 6/1998 | Moriga et al. |
| 6,350,796 | B1 | 2/2002 | Dworak et al. |
| 6,673,877 | B2 | 1/2004 | Paar et al. |
| 2004/0044102 | A1 | 3/2004 | Hashimoto |

FOREIGN PATENT DOCUMENTS

| | | |
|---|---|---|
| DE | 29 28 552 | 1/1981 |
| DE | 36 43 751 | 6/1988 |
| EP | 0 661 314 | 7/1995 |
| EP | 0 694 531 | 1/1996 |
| EP | 0 997 486 | 5/2000 |
| EP | 1 233 034 | 8/2002 |
| EP | 1 359 172 | 11/2003 |
| GB | 1 464 964 | 2/1977 |
| JP | 51-28198 | 3/1976 |
| JP | 61-171721 | 8/1986 |
| JP | 1-266123 | 10/1989 |
| JP | 5-86152 | 4/1993 |
| JP | 5-311125 | 11/1993 |
| WO | WO-02/48226 | 6/2002 |

* cited by examiner

*Primary Examiner*—Michael J Feely
(74) *Attorney, Agent, or Firm*—Connolly Bove Lodge & Hutz LLP

(57) ABSTRACT

Aqueous radiation curable binders comprising non-ionically stabilized epoxy resins ABC. Resins ABC are an adduct mixture of: adducts formed by the reaction of polyethylene glycol-modified epoxy resins A with olefinically unsaturated acids C, and adducts formed by the reaction of epoxy resins B, that are free from polyethylene glycol derived groups, with olefinically unsaturated acids C. A process for preparing aqueous radiation curable binders comprising non-ionically stabilized epoxy resins ABC, and a process of coating a substrate with aqueous radiation curable binders comprising non-ionically stabilized epoxy resins ABC.

16 Claims, No Drawings

AQUEOUS NON-IONICALLY STABILIZED EPOXY RESINS

RELATED APPLICATIONS

This application is a national stage application (under 35 U.S.C. 371) of PCT/EP2003/011561 filed Oct. 17, 2003 which claims benefit to Austrian application A1598/2002 filed Oct. 21, 2002.

The invention relates to aqueous non-ionically stabilised epoxy resin. It further relates to a process for their preparation and the use thereof as radiation curable binders especially for coil coating paints.

Aqueous radiation curable binders have been known, inter alia, from EP-B 0 694 531. Though elastic paint films can be made therewith, they impart only insufficient corrosion protection.

Radiation curable binders, without solvent (in bulk) or dissolved in an organic solvent, if their degree of polymerisation is sufficient for the properties sought, have a viscosity in the application form which is markedly higher than that of aqueous systems. A reduction of the viscosity is only possible by adding reactive diluents. In contrast thereto, the viscosity of aqueous dispersions is not dependent on the degree of polymerisation of the dispersed phase, but essentially only of its volume fraction.

Aqueous paints for use in the so-called coil coating process have been known, e.g. from U.S. Pat. No. 5,763,507. These paints are based on binders derived from water-reducible epoxy resins modified with (meth)acrylates, and lead to a satisfactory corrosion protection; they are cured by adding resins containing methylol groups, in particular resols. Curing temperature in a continuous oven is 240° C.

In view of this state of the art, the objective of the present invention was to provide binders on the basis of water-reducible epoxy resins curable at low temperatures, in particular by action of high energy radiation. The film formed upon coating the substrate should dry quickly, should be curable to elastic films, and should protect the substrate effectively from corrosion.

This objective is achieved by providing aqueous binders comprising aqueous, non-ionically stabilised epoxy resins having radically polymerisable groups.

The present invention is therefore directed to binders comprising aqueous non-ionically stabilised epoxy resins ABC which are mixtures of adducts of polyethylene glycol-modified epoxy resins A and epoxy resins B that are free from polyethylene glycol, with olefinically unsaturated acids C having olefinically unsaturated groups containing building blocks derived from epoxy resins A modified with polyethylene glycol, epoxy resins B being free from polyethylene glycol derived groups, and olefinically unsaturated acids C.

A further subject of the present invention are mixtures of the aqueous non-ionically stabilised epoxy resins ABC which are mixtures of adducts of polyethylene glycol-modified epoxy resins A and epoxy resins B that are free from polyethylene glycol, with olefinically unsaturated acids C with unsaturated urethanes DEF derived from polyfunctional isocyanates D, of polyhydric alcohols E, and of hydroxyl group-containing olefin ically unsaturated compounds F.

A further subject of the present invention is a process for the preparation of the aqueous non-ionically stabilised epoxy resins ABC which are mixtures of adducts of polyethylene glycol-modified epoxy resins A and epoxy resins B that are free from polyethylene glycol, with olefinically unsaturated acids C and a process for the preparation of mixtures of the epoxy resins ABC and the unsaturated urethanes DEF.

The invention further relates to a preferred embodiment wherein the aqueous non-ionically stabilised epoxy resins ABC which are mixtures of adducts of polyethylene glycol-modified epoxy resins A and epoxy resins B that are free from polyethylene glycol, with olefinically unsaturated acids C, optionally as a mixture with the unsaturated urethanes DEF, are mixed with reaction products G'GHI of epoxy resins G' with at least two epoxide groups per molecule, and reaction products GHI of epoxy resins G, fatty acids H, and amines I, as described in the published European patent application EP-A 1 233 034.

At least 50% of all reaction products derived from the epoxy resins A and B have at least one ester group formed by reaction of a terminal epoxy group with an olefinically unsaturated acid C.

The epoxy resins A comprise building blocks of polyfunctional epoxy resins as described under B having at least two epoxide groups per molecule, and of polyethylene glycols having at least two hydroxyl groups per molecule. Such modified epoxy resins have been known from, e.g., DE-A 36 43 751, the portion of which relating to these epoxy resin being incorporated herein by this reference. In lieu of the polyethylene glycol, copolyether polyols can be used, having oxyethylene and oxypropylene building blocks which may be distributed as blocks, or in random fashion. Preferred are such copolyether polyols having a mass fraction of at least 50%, preferably of at least 70%, and with particular preference, of at least 80% of oxyethylene groups. It is also possible to make a hydrophilic epoxy resin by reacting a polyepoxide with a primary or secondary polyethylene/propylene glycol mono-ether amine or by reaction of a hydroxyl group containing polyepoxide with a diisocyanate and a polyethylene glycol or polypropylene glycol monoether, as described in EP-A 0 661 314. Preferred are such epoxy resins derived from polyethylene glycol of a weight average molar mass $M_W$ of 200 g/mol to 20 000 g/mol, preferably from 300 g/mol to 10 000 g/mol. Also preferred are such epoxy resins A where, in the preparation of which, the ratio of the number of hydroxyl groups in the polyethylene glycol to the number of epoxide groups in the epoxy resin is from about 1:0.8 to about 1:4; preferably from 1:1 to 1:3.5, and also such epoxy resins having a specific content of epoxy groups between 2.5 mmol/kg and 200 mmol/kg ("epoxy equivalent weight" of from 5 kg/mol to 400 kg/mol).

The epoxy, resins B which are free of polyoxyethylene groups are selected from compounds having, on average, more than one epoxide group, preferably two epoxide groups, per molecule. These epoxide compounds, also called epoxy resins, may be saturated and unsaturated, aliphatic, cycloaliphatic, aromatic, or heterocyclic, and may also contain hydroxyl groups. They can also comprise such substituents not giving rise to unwanted side reactions under the mixing and reaction conditions, such as alkyl and aryl substituents, ether groups, and the like. Preferably, these are glycidyl ethers of polyhydric phenols or of polyhydric alcohols, having a specific content of epoxide group between 1.1 mol/kg and 6.7 mol/kg ("epoxide equivalent weight" of between 150 g/mol and 900 g/mol), preferably between 1.5 mol/kg and 6.7 mol/kg (between 150 g/mol and 650 g/mol), and having hydroxyl numbers of 0 mg/g to 200 mg/g, preferably from 5 mg/g to 100 mg/g.

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

As polyhydric phenols, mention is made of resorcinol, hydroquinone, 2,2-bis-(4'-hydroxyphenyl)-propane (bisphenol A), mixtures of isomers of dihydroxydiphenyl methane (bisphenol F), 4,4'-di-hydroxydiphenyl cyclohexane, 4,4'-di-hydroxy-3,3'-dimethyldiphenyl propane, 4,4'-dihydroxy-diphenyl, 4,4'-dihydroxybenzophenone, bis-(4'-hydroxyphenyl)-1,1-ethane, bis-(4'-hydroxyphenyl)-1,1-isobutane, bis-(4'-hydroxy-tert.-butylphenyl)-2,2-propane, bis-(2-hydroxy-naphthyl)-methane, 1,5-dihydroxynaphthalene, tris-(4-hydroxyphenyl)-methane, bis-(4-hydroxy-phenyl) ether, bis-(4-hydroxyphenyl) sulfone and the chlorination and bromination products of the compounds mentioned here.

Polyglycidyl ethers of polyhydric alcohols can also be used, such as ethane diol-1,2-diglycidyl ether, propane diol-1,2-diglycidyl ether, propane diol-1,3-diglycidyl ether, butane diol diglycidylether, pentane diol diglycidylether, neopentyl glycol diglycidylether, hexane diol diglycidylether, diethyleneglycol diglycidylether, dipropylene glycol diglycidylether, diglycidyl ethers of higher polyoxyalkylene glycols, such as diglycidyl ethers of higher polyoxyethylene glycols, and diglycidyl ethers of polyoxypropylene glycols, mixed diglycidyl ethers of higher polyoxyethylene glycols and polyoxypropylene glycols, polyoxytetramethylene glycol diglycidylether, polyglycidylethers of glycerol, trimethylol propane, trimethylol ethane, pentaerythritol, sorbitol, polyglycidylethers of oxyalkylated polyols such as of glycerol, trimethylol propane, pentaerythritol, the diglycidylethers of cyclohexanedimethanol, bis-(4-hydroxycyclohexyl)methane and 2,2-bis-(4'-hydroxycyclohexyl)-propane, polyglycidylethers of castor oil, or of tris-(2-hydroxy-ethyl) isocyanurate. Preferred are polyglycidyl ethers with a specific content of epoxide groups of from 1.25 mol/kg to 6.7 mol/kg (epoxide equivalent weight of from 150 g/mol to 800 g/mol), particularly, of from 2.5 mol/kg to 3.4 mol/kg (300 g/mol to 400 g/mol). Further, also polyglycidyl esters of polycarboxylic acids can be used, made by reaction of epichlorohydrin or similar epoxidic compounds with an aliphatic, cycloaliphatic or aromatic polycarboxylic acid such as oxalic, suberic, adipic, glutaric, phthalic, terephthalic, tetrahydrophthalic, hexahydrophthalic, 2,6-naphthalene dicarboxylic, and diglycidyl esters of higher dicarboxylic acids, such as dimerised or trimerised linolenic acid. Examples are the diglycidyl esters of adipic, phthalic, and hexahydrophthalic acids. The same ranges of specific content of epoxide groups are preferred here.

The olefinically unsaturated carboxylic acids C have at least one acid group which preferably is a carboxylic acid group, and at least one olefinic double bond. Preferred are such acids having a double bond in alpha position to the acid group, and especially preferred are such compounds having a hydrogen atoms or a methyl group at the carbon atom in alpha position. Preferred acids are in particular acrylic and methacrylic acids, crotonic acid, isocrotonic acid, maleic acid, fumaric acid, citraconic acid, mesaconic acid, and semi esters of the dibasic carboxylic acids mentioned.

The polyfunctional isocyanates D are at least difunctional and may be selected from aromatic and aliphatic linear, cyclic or branched isocyanates, especially diisocyanates. Preferred are diisocyanates, where up to 5% of the mass of which may be replaced by tri- or higher functional isocyanates.

The diisocyanates preferably conform to the formula $Q(NCO)_2$, where Q stands for a hydrocarbon residue of from 4 to 40 carbon atoms, especially for a hydrocarbon residue of from 4 to 20 carbon atoms, and preferably for an aliphatic hydrocarbon residue of from 4 to 12 carbon atoms, a cycloaliphatic hydrocarbon residue of from 6 to 15 carbon atoms, an aromatic hydrocarbon residue of from 6 to 15 carbon atoms, or an araliphatic hydrocarbon residue of from 7 to 15 carbon atoms. Examples of such preferred diisocyanates are tetramethylene diisocyanate, hexamethylene diisocyanate, dodecamethylene diisocyanate, 1,4-diisocyanato cylohexane, 3-isocyanatomethyl-3,5,5-trimethylcyclohexyl isocyanate (isophorone diisocyanate, IPDI), 4,4'-diisocyanatodicyclohexyl-methane, 4,4'-diisocyanatodicyclohexyl propane-(2,2), 1,4-diisocyanatobenzene, 2,4-oder 2,6-diisocyanatotoluene or mixtures thereof, 4,4'- or 2,4'-diisocyanatodiphenylmethane, 4,4'-diisocyanatodiphenylpropane-(2,2), p-xylylene diisocyanate and α, α, α',α'-tetramethyl-m-oder p-xylylene diisocyanate as well as mixtures comprising these compounds.

Besides such simple polyisocyanates, equally suitable are those that contain hetero atoms in the residue linking the isocyanate groups. Examples for these are polyisocyanates having carbodiimide groups, allophanate groups, isocyanurate groups, urethane groups, acylated urea groups, or biuret groups. For further suitable polyisocyanates, reference is made to DE-A 29 28 552.

The polyhydric alcohols E have at least two hydroxyl groups per molecule and from 2 to 150 carbon atoms, preferably from 3 to 40, and particularly preferable, from 4 to 20 carbon atoms. They may be linear, branched or cyclic, and may also contain non-carbon carbon linkages such as ether or ester bonds or secondary or tertiary amine bonds in the molecule. Such compounds are ether alcohols or polyether alcohols like polyethylene glycol, polypropylene glycol, mixtures and copolymers thereof and polyoxybutylene diol ("poly-THF"), as well as polyester alcohols, and amino alcohols. Preferred are ethylene glycol, 1,2- and 1,3-propane diol, 1,2- and 1,4-butane diol, neopentyl glycol, 1,6-hexane diol, trimethylolethane, glycerol, trimethylolpropane, erythritol, pentaerythritol, sorbitol, mannitol, ditrimethylol ethane, diglycerol, ditrimethylol propane, diethylene glycol, triethylene glycol, di- and tri-propylene glycol, diethanolamine, N-methyldiethanolamine, triethanolamine, ethoxylated trimethylolpropane und ethoxylated glycerol.

Particularly preferred are 1,4-butane diol und 1,6-hexane diol.

The olefinically unsaturated compounds F comprising hydroxyl groups are aliphatic singly or polyunsaturated compounds having from 3 to 20 carbon atoms and at least one hydroxyl group. Particularly preferred are allyl alcohol, hydroxyethyl acrylate, hydroxyethyl methacrylate, 2- and 3-hydroxypropyl (meth)acrylate, 1-hydroxy-2-propyl (meth)acrylate, 4-hydroxybutyl (meth)acrylate and 6-hydroxyhexyl (meth)acrylate as well as acrylates and methacrylates that are formed by reaction of (meth)acrylic acid with 1,2-epoxy compounds, especially with esters or ethers of glycidyl alcohol and monohydric aliphatic alcohols or acids that have, in a preferred embodiment, tertiary or quaternary carbon atoms. Such compounds are, e.g. esters of glycidyl alcohol and aliphatic monocarboxylic acids which are branched in the alpha position and have from 5 to 12 carbon atoms, commonly referred to as ®Versatic acids.

The invention further relates to a process for the preparation of the said mixtures of the aqueous non-ionically stabilised epoxy resins ABC which are mixtures of adducts of polyethylene glycol-modified epoxy resins A and epoxy resins B that are free from polyethylene glycol, with olefinically unsaturated acids C, wherein at first, a chain extended resin is made from the epoxy resin A modified with polyethylene glycol, the hydroxy compound on which the epoxy resin is based, and the diepoxide on which the epoxy resin is based, in the mode of an advancement reaction, mixing this chain-extended epoxy resin with the non-modified epoxy resin B and reacting the mixture thus obtained with the olefinically unsaturated acid C. An adduct mixture ABC is formed under ring opening of the epoxy rings, the molecules formed having a semiester group and a hydroxyl group which is preferably secondary. In a separate reaction (step 3), a urethane acrylate DEF is made from a polyfunctional isocyanate, optionally, a saturated polyhydric aliphatic compound E, and an olefinically unsaturated aliphatic hydroxy compound F having one hydroxyl group and at least one olefinic double bond. Finally, the adduct mixture ABC is mixed in the fourth step with the unsaturated urethanes DEF to form the mixtures according to the invention.

In these mixtures, the ratio of the mass of epoxy resins ABC to the mass of the urethanes DEF (weighing, in each case, always the mass of solids, viz., without the contribution of the dispersing agent or the solvent) is from (90 to 30):(10 to 70), preferably (80 to 35):(20 to 65), and particularly, (60 to 40):(40 to 60).

Preferably, a water dispersible epoxy resin is made by reacting, in the first step, an epoxy resin having an average of two epoxy groups per molecule, and a polyethylene glycol under ring opening, which resin is then reacted, in the second step, with one of the polyhydric phenols described under component B, and a glycidyl ester or ether described under component B, in an advancement reaction, optionally with a catalyst, to form the hydrophilic epoxy resin A with the preferred specific content of epoxide groups of approximately 1.2 mol/kg to approximately 1.5 mol/kg ("epoxide equivalent weight" of about 670 g/mol to about 830 g/mol). Water used as dispersing agent is removed by distillation under reduced pressure from the reaction product of the epoxy resin with the polyethylene glycol before catalyst is added. Then, epoxy resin B is admixed, and the acid C is added to the mixture. Addition of the acid C to the mixture of epoxy resins is preferably conducted at temperatures of 90° C. to 130° C. during about 6 to 10 hours, with a reduction of the acid number of the reaction mixture to less than 10 mg/g.

The acid number is defined according to DIN EN ISO 3682 (DIN 53 402) as the ratio of the mass $m_{KOH}$ of potassium hydroxide which is needed to neutralise the sample in question, and the mass $m_B$ of the sample (or mass of solids in the sample in the case of solutions or dispersions); the customary unit is "mg/g".

The unsaturated urethane acrylate is preferably made by charging the unsaturated, hydroxyl group-containing compound F, optionally in mixture with the polyhydric aliphatic alcohol E, and preferably, a catalyst which accelerates the formation of urethanes, heating the charge to 60° C. to 90° C., and adding the isocyanate D in a way that the temperature remains in the said range. When a mass fraction of isocyanate groups of less than 1 cg/g, preferably less than 0.1 cg/g (a mass fraction of less than 1%, or less than 0.1%) has been reached, the reaction mixture is cooled and the resulting urethane DEF is mixed with the epoxy component ABC.

It is also possible to add to the mixture of ABC and DEF a further quantity of the adduct of epoxy resin and polyethylene glycol according to component A to improve the dispersability of the mixture. This quantity can be preferably from 2% to 10%, in particular 4% to 8% of the sum of the masses of ABC and DEF. This ratio relates to the masses of solids, in each case.

The invention further relates to a preferred embodiment wherein to the aqueous non-ionically stabilised epoxy resin ABC which are mixtures of adducts of polyethylene glycol-modified epoxy resins A and epoxy resins B that are free from polyethylene glycol, with olefinically unsaturated acids C or to the mixture thereof with the unsaturated urethane DEF, reaction products G'GHI of epoxy resins G' having at least two epoxide groups per molecule and reaction products GHI of epoxy resins G, fatty acids H and amines I, which have been described in the European Patent Application EP-A 1 233 034. The description of these reaction products and the synthetical procedure leading to these is incorporated herein by reference. The experiments that have led to the instant invention have shown that the excellent corrosion protection of coatings formulated with the aqueous non-ionically stabilised epoxy resins according to the invention can still be improved by such admixture.

The ratio of the mass of the epoxy resins ABC or of the sum of masses of epoxy resin ABC and the urethane DEF to the mass of the reaction product G'GHI is then chosen to be (90 to 30):(10 to 70), preferably (80 to 40):(20 to 60), and particularly preferred, (70 to 45):(30 to 55).

The epoxy resins G and G' otherwise conform to the description for component B, their specific content of epoxide groups is, independently of each other, in each case, 0.4 mmol/kg to 7 mol/kg, and in particular, 0.6 mol/kg to 6 mol/kg. In a preferred embodiment, diepoxide compounds are used for each G and G', the specific content of epoxide groups of G being 0.5 mol/kg to 4 mol/kg, and that of G' 2 mol/kg to 5.9 mol/kg.

It is especially preferred to use epoxy resins on the basis of bisphenol A and bisphenol F or mixtures of these.

The fatty acids H have at least one olefinic double bond, and from 6 to 30, preferably from 8 to 26, and particularly preferred, from 16 to 22 carbon atoms. Preferred examples are palmoleic acid, oleic acid, erucic acid, linolic acid, linolenic acid, elaostearic acid, arachidonic acid, and clupanodonic acid as well as the mixtures of fatty acids made from naturally occurring oils such as linseed oil fatty acid, soy bean oil fatty acid, conjuvandolic fatty acid, tall oil fatty acid, cotton seed oil fatty acid, tape seed oil fatty acid, fish oil fatty acid, and fatty acid mixtures made from dehydrated castor oil.

The amines I are preferably aliphatic linear cyclic or branched amines having at least one primary or secondary amino group. They have preferably from 2 to 12 carbon atoms, and may also contain, as functional groups, tertiary amino groups and/or hydroxyl groups. Especially suited are primary monoamines with from 6 to 12 carbon atoms such as hexylamine, cyclohexylamine, 2-ethyl-hexylamine and stearylamine, primary diamines such as ethylene diamine, 1,4-diaminobutane and 1,6-diaminohexane, primary-tertiary diamines such as dimethylaminopropylamine, diethylaminopropylamine, diprimary-secondary amines such as diethylene triamine, 1,9-diamino-5-azanonane, 1,13-diamino-7-azatridecane, triethylene tetramine and tetraethylene pentamine and the mixtures of oligomeric diaminopolyethylene imines commercially available as ®Polymin, and also secondary amines and diamines like piperidine, piperazine, di-n-butylamine, morpholine, and hydroxyfunctional amines such as ethanolamine, diethanolamine and diisopropanolamine. It is also possible to use mixtures of the said amines.

The products GHI may be obtained by sequential reaction, wherein at first, the epoxy compounds G are reacted with the amines I to from a product GI, and these adducts are then reacted in the second step with the fatty acids H to the intermediate GHI. It is likewise possible to react at first the compounds G with the fatty acids H, and then react the remaining epoxide groups with the amine I. It is likewise possible to have the reaction take place concurrently, and obtain the products GHI in one step. The quantities of educts, or starting materials G, H, and I are chosen such that substantially all epoxide groups, viz., at least 90%, preferably, at least 95%, and particularly preferred, at least 98% of all epoxide groups originally present in G, are consumed. It is also preferred to conduct the reaction in a way that the intermediate GHI is free of reactive amine hydrogen atoms, the specific content of amine hydrogen atoms shall in no case exceed 10 mmol/kg.

For the synthesis of the reaction products G'GHI, the components are preferably reacted in the following amount-of-substance fractions (mole fractions):

for 1 mol of the epoxide compound G, from 0.1 mol to 1.0 mol, preferably from 0.2 mol to 0.9 mol, and particularly preferred, from 0.25 mol to 0.8 mol of the fatty acids H, and from 0.5 mol to 1.9 mol, preferably from 0.6 mol to 1.75 mol, and particularly preferred 0.65 mol to 1.5 mol, of the amines I are reacted in the first step, and in the second step of the reaction, from 0.2 mol to 1.0 mol, preferably from 0.25 mol to 0.9 mol, and particularly preferred, 0.3 mol to 0.8 mol of the epoxide compound G' with the adduct of step 1.

The aqueous non-ionically stabilised epoxy resins according to the invention and mixtures comprising these can be formulated to coating compositions which form rapidly drying films on substrates such as metal, plastics, wood, textiles, or cardboard. These films can be cured by irradiation with high energy light or other actinic radiation, show excellent adherence to the substrate, and do not separate from the substrate even upon impact, and provide excellent corrosion protection especially in contact with acidic and saline aqueous solutions.

They are especially suited for the coating of metals, the paint films protecting the substrate effectively against corrosion, and forming coatings with outstanding elasticity.

When paints are formulated, photoinitiators are preferably added, and optionally, further common additives such as defoamers, levelling agents, and anti-settling agents if pigmented paints are made.

The paint film is applied by of the usual methods such as dipping, brushing, spraying or application with a doctor blade, subjected to an air stream at 20° C. to 90° C., preferably at approximately 60° C. to approximately 70° C., and then cured by irradiation with high-energy radiation under cross-linking.

The following examples serve to illustrate the invention. All data with the unit "%" mean mass fractions (ratio of the mass of the substance in question to the sumn of masses in the mixture) if not explained otherwise. Concentrations in "%" mean mass of solute divided by mass of solution.

EXAMPLE 1

Hydrophilic Epoxy Resin 1000 g of polyethylene glycol PEG 4000 (average molar mass approximately 4000 g/mol) were heated to 120° C., and dissolved water was removed by distillation under reduced pressure and a flow of nitrogen. 110 g of bisphenol A diglycidylether and thereafter 1.7 g of a 50% strength aqueous solution of tetrafluoroboric acid were added. When a constant value of specific content of epoxide groups was reached (approximately 0.1 mol/kg to 0.2 mol/kg), 1100 g of water were added to dilute to a mass fraction of solids of approximately 50%.

EXAMPLE 2

Adduct of Epoxy Resin and Acid 534 g of bisphenol A diglycidylether were mixed with 165 g of bisphenol A and 600 g of the aqueous solution of Example 1, and heated to 125° C. Approximately 300 g of water were removed by distillation under reduced pressure, 0.2 g of triphenylphosphine were added after removal of the water at that temperature. Due to the exothermic reaction, the temperature rose to approximately 140° C. The mixture was kept at that temperature for about 4 hours until the specific content of epoxide groups had fallen to from 1.3 mol/kg to 1.4 mol/kg. Further 700 g of bisphenol A diglycidylether were added and the mixture was cooled to 105° C. Under an air blanket, 365 g of acrylic acid, stabilised with 4 g of hydroquinone monomethylether, and 2 g of benzyl dimethylamine were added over 2 hours.

EXAMPLE 3

Urethane Acrylate 1334 g of an adduct of equal amounts of substance of acrylic acid and the glycidyl ester of ®Versatic-10-Acid (a mixture of alpha-branched saturated aliphatic monocarboxylic acids of 10 5 carbon atoms, with at least one of the alkyl residues in alpha position being a methyl residue), 180 g of 1,4-butane diol, 3 g of hydroquinone monomethylether and 0.6 g of dibutyltin dilaurate were mixed and heated to from 70° C. to 80° C. Under an air blanket, 696 g of a commercial mixture of 2,4- and 2,6-toluylene diisocyanate were added in a way that the temperature could be kept constant. After two hours, the mass fraction of isocyanate groups still unreacted was below 0.1 cg/g.

EXAMPLE 4

Mixture of Urethane Acrylate with Epoxy Resin Acid Adduct 1845 g of the epoxy resin acid adduct of Example 2 were mixed with 1760 g of the urethane acrylate of Example 3 and well stirred. Three lots of 609 g of demineralised water each were added and well mixed with a fast stirrer. By adding a further quantity of 502 g of demineralised water, a mass fraction of solids of approximately 60% was reached.

EXAMPLE 5

Test of the Binder of Example 4

To 100 g of the aqueous dispersion of Example 4, a solution of 3 g of a photoinitiator (®Irgacure 184) in 3 g of butylglycol was added. The clearcoat paint had a viscosity of 1014 Mpa·s at 23° C. and a shear gradient of 25 $s^{-1}$.

Using this clearcoat paint, a steel sheet made from ST 1405, untreated (Example 5.1) and a steel sheet 26S/60/OC (made from ST 1405, phosphatised, Example 5.2) each were coated and dried at 60° C. during 10 minutes. Dry film thickness was 50 μm in all cases. Pendulum hardness (after König, determined on a glass plate, at 50 μm dry film thickness) was 174 s, measured 24 h after drying.

As a comparison (Examples 5V.1 and 5V.2), steel sheets of the same material were coated with a commercial urethane acrylate paint, dissolved in a reactive diluent (trimethylolpropane-formal monoacrylate), with the same dry film thickness. A water based paint was used, according to that described in EP-B 0 694 531, (Example 6, with the urethane of Example 4) for comparison examples V3 und V4.

The aqueous paint was applied with a doctor blade, dried in air at room temperature for 10 to 15 minutes, and then cured by irradiation with UV light (80 W) in a distance of 10 cm and a speed of from 5 m/min to 10 m/min.

Further to mechanical testing, the coated steel sheets were also tested for water and solvent resistance of the cured film, and for corrosion resistance using the salt spray test. For water and solvent resistance, the time is stated until which no visible effect occurred. In the corrosion test, the fraction of the area that was covered with rust is given.

The results can be found in tables 1 and 2.

EXAMPLE 6

Mixture of Binder of Example 4 and an Epoxy Resin—Amine—Fatty Acid Adduct

According to EP-A 1 233 034, an adduct has been made.

1900 g of an epoxy resin based on bisphenol A having a specific content of epoxide groups of 2.1 mol/kg ("epoxide equivalent weight" EEW=475 g/mol) were dissolved in methoxypropanol together with 420 g of tall oil fatty acid (1.5 mol), 102 g of dimethylaminopropylamine (1 mol) and 53 g (0.5 mol) diethanolamine to form a 70% strength solution (70 g of solids in 100 g of solution) and reacted at 110° C. until the epoxide groups were fully consumed.

Thereafter, 60 mmol of acetic acid for every 100 g of solid resin were added. The solution was further diluted by adding demineralised water to a mass fraction of solids of 44%.

To this aqueous solution, 250 g of bisphenol A diglycidyl ether were added at 90° C. within one hour. The mixture was stirred at this temperature until no more epoxide groups were detectable. The solution was further diluted by addition of water to a mass fraction of solids of 38%. 60 g of this aqueous binder were mixed to 60 g of the binder of Example 4, further 30 g of water and a solution of 3 g of ®Irgacure 184 in 3 g of butylglycol were added. The viscosity of the clearcoat paint was 122 mPa·s. Pendulum hardness of a film, measured on a glass plate at 50 μm dry film thickness) was 111 s after 24 h drying.

EXAMPLE 7

Test Results of the Resins of Example 6

Steel sheets of the same material as in Examples 5 were coated with the clearcoat paint of Examples 6 (Examples 6.1 and 6.2), in a dry film thickness of 50 Wm. Application and curing of the paint is done as in Examples 5. The results of the mechanical tests, the solvent resistance and corrosion tests are summarised in the tables.

TABLE 1

| | Test Results | | | | | | | |
|---|---|---|---|---|---|---|---|---|
| | Clearcoat Paint of Examples | | | | | | | |
| | 5 | | Comparison | | | | 6 | |
| Steel Sheet | 5.1 Rust prot. | 5.2 phosph. | V.1 Rust prot. | V.2 phosph.t | V.3 Rust prot. | V.4 phosph. | 6.1 Rust prot. | 6.2 phosph. |
| Erichsen Indentation in mm | 8.5 | 6.5 | 9 | 9 | 8 | 7 | 9 | 9 |
| Ball Impact in J (in lb) | 7.9/3.4 (70/30) | 3.4/1.1 (30/10) | 9.0/9.0 (80/80) | 9.0/9.0 (80/80) | 9.0/7.9 (80/70) | 7.9/5.7 (70/50) | 7.9/5.7 (70/50) | 5.7/4.5 (50/40) |
| Cross Hatch Test | 3/4 | 0/0 | 0/0 | 0/0 | 3/4 | 1/2 | 0/0 | 0/0 |

Erichsen Indentation has been determined according to DIN EN ISO 1520, Cross Hatch Test according to DIN EN ISO 2409, and Ball Impact test according ASTM standard D 2794.

It can bee seen that aqueous clearcoat paint according to Examples 5 and 6 leads to films with an equally excellent protection. The results of the mechanical test are on par with solvent borne systems with reactive diluents.

TABLE 2

Chemical Test and Corrosion Test

| | Clear Coat of Example | | | | | | | |
| --- | --- | --- | --- | --- | --- | --- | --- | --- |
| | 5 | | Comparison | | | | 6 | |
| Steel Sheet | 5.1 Rust prot. | 5.2 phosph. | V.1 Rust prot. | V.2 phosph. | V.3 Rust prot. | V.4 phosph. | 6.1 Rust prot. | 6.2 phosph. |
| Water Resistance in h | >24 | >24 | >24 | >24 | >24 | >24 | >24 | >24 |
| Acetone Resistance in h | >24 | >24 | >4 | >4 | 16 | 16 | 1 | 1 |
| Salt Spray Test after 24 h | | | | | | | | |
| with groove | 10 mm | OK | 20 mm | OK | 20 mm | 10 mm | OK | OK |
| no groove | 30% B | OK | 80% R | OK | 40% B | 20% B | OK | OK |
| Saltspray Test after 72 h | | | | | | | | |
| with groove | 20 mm | OK | | OK | 100% B | 90% B | 2 mm | OK |
| no groove | 80% B | OK | | 5% R | 100% B | 90% B | OK | OK |
| Saltspray Test after 96 h | | | | | | | | |
| with groove | | OK | | OK | | | 2 mm | OK |
| no groove | | OK | | 10% R | | | OK | OK |
| Saltspray Test after 360 h | | | | | | | | |
| with groove | | 7 mm | | 5 mm | | | 20 mm | 2 mm |
| | | | | 10% R | | | 10% R | |
| no groove | | 2% R | | 30% R | | | 40% R, w | w |

Under "Resistance" those times are stated where the film does not show visible change in contact with the agent (water, acetone). In the Salt Spray Test, length in mm means the length of the rust path from the groove, the values: "R" the fraction of the area in % where there is rust and corrosion; a "w" means "white rust".

It is clear from these data that the clearcoat paints according to the invention impart much better corrosion resistance than known systems on the basis of reactive diluents (V1, V2) or the known systems with anionically stabilised urethane acrylates. (V3 and V4 according to EP-B 0 694 531).

The invention claimed is:

1. Aqueous radiation curable binders comprising non-onically stabilized epoxy resins ABC which are mixtures of adducts of polyethylene glycol-modified epoxy resins A and epoxy resins B that are free from polyethylene glycol derived groups, with olefinically unsaturated acids C, characterized in that they comprise building blocks of epoxy resins A modified with polyethylene glycol made by reaction, under ring opening, of polyethylene glycol and a epoxy resin having an average of two epoxy groups per molecule, and then reacting the resin obtained with a polyhydric phenol and a glycidyl ester or a glycidyl ether of a polyhydric phenol in an advancement reaction which glycidyl ethers have a specific content of epoxide groups of between 1.1 mol/kg and 6.7 mol/kg, of epoxy resins B that are free from polyethylene glycol, and of olefinically unsaturated acids C, and that all reaction products derived from the epoxy resins A and B comprise at least one ester group formed by reaction of a terminal epoxy group with an olefinically unsaturated acid C.

2. Aqueous radiation curable binders according to claim 1, characterized in that they contain unsaturated urethanes DEF which are reaction products prepared by reacting polyfunctional isocyanates D with a mixture of polyfunctional aliphatic alcohols E, and of hydroxyl group-containing olefinically unsaturated compounds F.

3. Aqueous radiation curable binders according to claim 2, characterized in that the ratio of the mass of the epoxy resins ABC to the mass of the urethanes DEF is (90 to 30) : (10 to 70).

4. A method of use of aqueous radiation curable binders according to claim 2 in the production of corrosion protection coatings, comprising the steps of mixing of the binders with a photoinitiator, and optionally further additives, coating of the substrate with the paint by rolling, dipping, spraying, brushing, or application with a doctor blade, drying of the coating at a temperature of from 20° C. to 90° C., and curing by irradiation with high energy radiation.

5. The method of claim 4 for the production of corrosion protection coatings on metals.

6. Aqueous radiation curable binders according to claim 2, characterized in that they additionally comprise reaction products G'GHI of epoxy resins G' with at least two epoxide groups per molecule, and reaction products GHI of epoxy resins C, fatty acids H and amines I.

7. Aqueous radiation curable binders according to claim 6, characterized in that the ratio of the mass of the epoxy resins ABC to the mass of the urethanes DEF is (90 to 30) : (10 to 70).

8. A method of use of aqueous radiation curable binders according to claim 6 in the production of corrosion protection coatings, comprising the steps of mixing of the binders with a photoinitiator, and optionally further additives, coating of the substrate with the paint by rolling, dipping, spraying, brushing, or application with a doctor blade, drying of the coating at a temperature of from 20° C. to 90° C., and curing by irradiation with high energy radiation.

9. The method of claim 8 for the production of corrosion protection coatings on metals.

10. Aqueous radiation curable binders according to claim 1,1 characterized in that they additionally comprise reaction products G'GHI of epoxy resins G' with at least two epoxide groups per molecule, and reaction products GHI of epoxy resins G, fatty acids H and amines I.

11. Aqueous radiation curable binders according to claim 10, characterized in that the ratio of the mass of the epoxy resins ABC to the mass of reaction products G'GHI is (90 to 30) : (10 to 70).

12. A method of use of aqueous radiation curable binders according to claim 10 in the production of corrosion protection coatings, comprising the steps of mixing of the binders with a photoinitiator, and optionally further additives, coating of the substrate with the paint by rolling, dipping, spraying, brushing, or application with a doctor blade, drying of the coating at a temperature of from 20° C. to 90° C., and curing by irradiation with high energy radiation.

13. The method of claim 12 for the production of corrosion protection coatings on metals.

14. A process for the preparation of aqueous radiation curable binders of claim 1, characterized in that in the first step, an hydrophilic epoxy resin A modified by polyethylene glycol is prepared by reacting in the first step, an epoxy resin having an average of two epoxy groups per molecule, and a polyethylene glycol, under ring opening, which resin is then reacted with one of the polyhydric phenols selected from the group consisting of resorcinol, hydroquinone, 2,2-bis-(4'-hydroxyphenyl)-propane (Bisphenol A), mixtures of isomers of dihydroxydiphenyl methane (bisphenol F), 4,4'-dihydroxy-diphenyl cyclohexane, 4,4'-dihydroxy-3,3-dimethyldiphenyl propane, 4,4'-dihydroxydiphenyl, 4,4'-dihydroxy-benzophenone, bis-(4'-hydroxyphenyl)-1 , 1-ethane, bis-(4'-hydroxyphenyl)-1 ,1-isobutane, bis-(4'-hydroxy-tert-butylphenyl)-2,2-propane, bis-(2-hydroxynaphthyl) methane, 1, 5-dihydroxynaphthalene, tris-(4-hydroxyphenyl) -methane, bis-(4-hydroxyphenyl) ether, bis-(4-hydroxyphenyl) sulfone and the chlorination and bromination products of the compounds mentioned here and a glycidyl ester or a glycidyl ether of a polyhydric phenol which glycidyl ethers have a specific content of epoxide groups of between 1.1 mol/kg and 6.7 mol/kg in the way of an advancement reaction, this epoxy resin is then mixed with an epoxy resin B which is not modified with polyethylene glycol, and in the second step this mixture is reacted with an olefinically unsaturated acid C, wherein in this step, non-ionically stabilized epoxy resins ABC is which are mixtures of adducts of polyethylene glycol -modified epoxy resins A and epoxy resins B that are free from polyoxyethylene groups, with olefinically unsaturated acids C are formed by ring opening of the epoxide rings.

15. A method of use of aqueous radiation curable binders according to claim 1, in the production of corrosion protection coatings, comprising the steps of mixing of the binders with a photoinitiator, and optionally further additives, coating of the substrate with the paint by rolling, dipping, spraying, brushing, or application with a doctor blade, drying of the coating at a temperature of from 20° C. to 90° C., and curing by irradiation with high energy radiation.

16. The method of claim 15 for the production of corrosion protection coatings on metals.

\* \* \* \* \*

UNITED STATES PATENT AND TRADEMARK OFFICE
CERTIFICATE OF CORRECTION

PATENT NO.       : 7,560,143 B2  
APPLICATION NO.  : 10/531090  
DATED            : July 14, 2009  
INVENTOR(S)      : Rami-Raimund Awad et al.

Page 1 of 1

It is certified that error appears in the above-identified patent and that said Letters Patent is hereby corrected as shown below:

In Claim 14, column 14, line 5, delete "bis-(2-hydroxynaphthyl methane" and insert -- bis-(2-hydroxynaphthyl)-methane --.

Signed and Sealed this

First Day of September, 2009

David J. Kappos  
*Director of the United States Patent and Trademark Office*